United States Patent [19]

Shimoyama et al.

[11] Patent Number: 5,783,819

[45] Date of Patent: Jul. 21, 1998

[54] SOLAR RADIATION SENSOR FOR AN AIR-CONDITIONING SYSTEM OF AN AUTOMOTIVE VEHICLE

[75] Inventors: Masaki Shimoyama, Kusatsu-shi; Noboru Maruyama, Nagano-ken, both of Japan

[73] Assignee: Yokogawa IMT Corporation Matsushita Electric Industrial Co., Ltd., Japan

[21] Appl. No.: 624,216

[22] Filed: Mar. 29, 1996

[30] Foreign Application Priority Data

Apr. 7, 1995 [JP] Japan .................. 7-082117

[51] Int. Cl.$^6$ ...................................... H01J 5/02
[52] U.S. Cl. .................. 250/239; 250/214.1; 257/433
[58] Field of Search .................. 250/239, 214.1, 250/214 R, 552; 257/433–436

[56] References Cited

U.S. PATENT DOCUMENTS

| | | | |
|---|---|---|---|
| 4,437,002 | 3/1984 | Taniguchi et al. | 250/338 |
| 4,516,027 | 5/1985 | Schimmelpfennig et al. | 250/338 |
| 5,298,742 | 3/1994 | Friauf et al. | 250/239 |
| 5,436,492 | 7/1995 | Yamanaka | 257/433 |
| 5,523,608 | 6/1996 | Kitaoka et al. | 257/433 |

FOREIGN PATENT DOCUMENTS

| | | |
|---|---|---|
| 62-47151 | 3/1987 | Japan . |
| 63-24008 | 2/1988 | Japan . |
| 63-43807 | 3/1988 | Japan . |

*Primary Examiner*—Que Le
*Attorney, Agent, or Firm*—Rossi & Associates

[57] ABSTRACT

A solar radiation sensor comprises a light sensing element 1 detecting the quantity of light entering therein, and first and second lead legs 4, 5 each conducting an electric signal representing the quantity of the light detected by the light sensing element 2. Light sensing element 2 and first and second lead legs 4, 5 are supported on a sensor casing body 1, so that light sensing element 2 is housed inside a transparent cover 3. Each of first and second lead legs 4, 5 has one end 4a, 5a formed into a contact portion connected to light sensing element 2 and the other end 4b, 5b formed into an external connecting terminal, thereby reducing the number of welded or soldered connections. An engaging ridge 1a is provided on the sensor casing body 1 to fix light sensing element 2 with respect to cover 3. First and second lead legs 4, 5 are integrated with sensor casing body 1.

8 Claims, 2 Drawing Sheets

SOLAR RADIATION SENSOR FOR AN AIR-CONDITIONING SYSTEM OF AN AUTOMOTIVE VEHICLE

BACKGROUND OF THE INVENTION

1. Field of the Invention

The present invention relates to a solar radiation sensor provided in a passenger compartment, for example on a dash board or on an instrument panel, of an automotive vehicle to detect the quantity of solar radiation and convert it into a signal necessary to control an air-conditioning system equipped in the automotive vehicle.

2. Prior Art

Quantity of solar radiation is a primary factor to be taken into consideration in the control of an air-conditioning system for an automotive vehicle, to provide comfortable air to a driver and passengers in a compartment. A solar radiation sensor thus detects the quantity of solar radiation or intensity of solar light received in the compartment.

More specifically, a typical solar radiation sensor comprises a light sensing element capable of detecting the quantity or intensity of solar radiation. The quantity of light entered into and detected by the solar radiation sensor is then converted into an electric signal sent through lead to a control unit of an air-conditioning system for controlling the temperature of air by considering the solar radiation that passengers actually receive.

The light sensing element is generally fixed in a casing of the solar radiation sensor. When the solar radiation sensor is installed, for example, on an instrument panel, the sensor body is fixed to the instrument panel by engaging a hook provided on the outer surface thereof with the panel.

FIG. 3 shows a this kind of conventional solar radiation sensor used for controlling an air-conditioning system of an automotive vehicle. In FIG. 3, positioning at the upper part of the sensor is a light detector 11. Inside the light detector 11, a light sensing element 12 is housed to detect the quantity of solar radiation and generate a signal representative of the quantity of solar radiation.

Light detector 11 is a sensitive and delicate device; accordingly, there is provided a cover 13 to protect and surround the body of light detector 11 entirely and hermetically. The cover 13 is transparent to the light and capable of converging the light like a lens. Thus, the light detector 11 can effectively receive light entering from all directions through cover 13.

In the design aspect, cover 13 is important in view of the fact that the appearance of the solar radiation sensor is virtually determined by the configuration of cover 13 when the sensor is installed on the instrument panel or the like in the passenger compartment.

The light detector 11 comprises a first lead leg 14 and a second lead leg 15 which extend downward from the body of light detector 11 and are connected to light sensing element 12 through connecting portions 11a and 11b, respectively. Connecting portions 11a and 11b are electrically connected with first and second lead legs 14 and 15.

Constituting the lower part of the solar radiation sensor is a connector casing 16 having a flat top and a cylindrical side wall. A pair of external connecting terminals 17 and 18 are integrated with connector casing 16, so that vertically extending long legs of terminals 17 and 18 penetrate from the top and extending into a hollow space inside the cylindrical body of connector casing 16.

The upper ends of connecting terminals 17 and 18 are connected, for example by solder, with the lower ends of first and second legs 14 and 15.

Thus, the signal generated from light detector 11 is sent to the control unit of the air-conditioning system via connecting portions 11a, 11b, first and second lead legs 14, 15, and external connecting terminals 17, 18.

Reference numeral 16a represents an engaging hook provided on the outer surface of connector casing 16, which is engaged with the instrument panel.

Light sensing element 12 is mounted on a frame 11c of light detector 11. Frame 11c is engaged with cover 13 so as to regulate the positional relationship between light sensing element 12 and cover 13, thereby eliminating dispersion in the performance characteristics of the solar radiation sensor.

However, the above-described conventional solar radiation sensor has a problem in that its reliability is not satisfactory due to many connecting portions, i.e. connection between connecting portions 11a, 11b of light detector 11 and lead legs 14, 15 and connection between lead legs 14, 15 and external connecting terminals 17, 18.

Furthermore, increase of the total number of connecting points will lead to undesirable extension of manufacturing time, as well as increase of the number of parts, accompanied by the increase of costs.

Furthermore, determining the positional relationship between cover 13 and light sensing element 12 by the engagement between the frame 11c of light detector 11 and cover 13 is not desirable in that the performance characteristics of each solar radiation sensor will be dispersed due to size difference or assembling error if these parts have. It is needless to say that lots of manpower and time will be required to correct such a dispersion.

SUMMARY OF THE INVENTION

Accordingly, in view of the above-described problems encountered in the prior art, a principal object of the present invention is to provide a novel, cheap, reliable solar radiation sensor used for controlling an air-conditioning system of an automotive vehicle.

In order to accomplish this and other related objects, a first aspect of the present invention provides a novel and reliable solar radiation sensor comprising: a light sensing element detecting the quantity of light entering therein; first and second lead legs each conducting an electric signal representing the quantity of the light detected by the light sensing element; a sensor casing body supporting the light sensing element and the first and second lead legs; a cover transparent to the light and protecting the light sensing element mounted on the sensor casing body, wherein each of the first and second lead legs has one end formed into a contact portion connected to the light sensing element and the other end formed into an external connecting terminal.

According to the features of preferred embodiments, there is provided an engaging portion on the sensor casing body to stabilize the positional relationship between the light sensing element with respect to the cover. The first and second lead legs are integrated with the sensor casing body. And, an infrared-ray shielding wall is provided on the sensor casing body so as to surround the light sensing element.

Furthermore, a second aspect of the present invention provides a novel and reliable solar radiation sensor comprising: a light sensing element detecting the quantity of light entering therein; a lead leg directly connected to the light sensing element; a sensor casing body having a surface on which the light sensing element is mounted; a cover transparent to the light and fixed to the sensor casing body so as to protect the light sensing element, where the lead has an upper part lying beneath the light sensing element and a lower part extending into a hollow space of the sensor casing body, the upper part serving as a means for providing direct connection to a bottom of the light sensing element, while the lower part serving as an external- connecting terminal for outputting an electric signal representing the quantity of the light detected by the light sensing element.

According to the features of preferred embodiments, the surface of the sensor casing body is almost flat except a region near the periphery of the light sensing element. A ridge is formed around the light sensing element to fix the light sensing element at a predetermined position on the surface of the sensor casing body. And, the lower part of the lead leg is bent perpendicularly at a portion near the upper part of the lead leg.

According to the solar radiation sensor for use in the automotive vehicle air-conditioning system in accordance with the present invention, the connecting portion to the light sensing element and the external connecting terminal are integrally formed as a single part of lead leg. Thus, it becomes possible to eliminate the necessity of providing the welded or soldered connections, being free from the problem of the conventional sensor that the welded or soldered connections will be possibly damaged by thermal expansion or contraction caused by frequent temperature changes, enhancing the reliability of the sensor as a result.

Furthermore, provision of the engaging portion can stabilize the positional relationship between the light sensing element and the cover acting as a lens, reducing the dispersion of performance characteristics.

Integrating the lead legs with the sensor casing body will lead to reduction of manpower and time in the installation or assembling of sensor parts, bringing the merits of reduction of manufacturing costs.

Finally, providing the infrared-ray shielding wall around the light sensing element will further stabilize the performance of the sensor.

BRIEF DESCRIPTION OF THE DRAWINGS

The above and other objects, features and advantages of the present invention will become more apparent from the following detailed description which is to be read in conjunction with the accompanying drawings, in which.

DETAILED DESCRIPTION OF THE PREFERRED EMBODIMENTS

Figure 1:
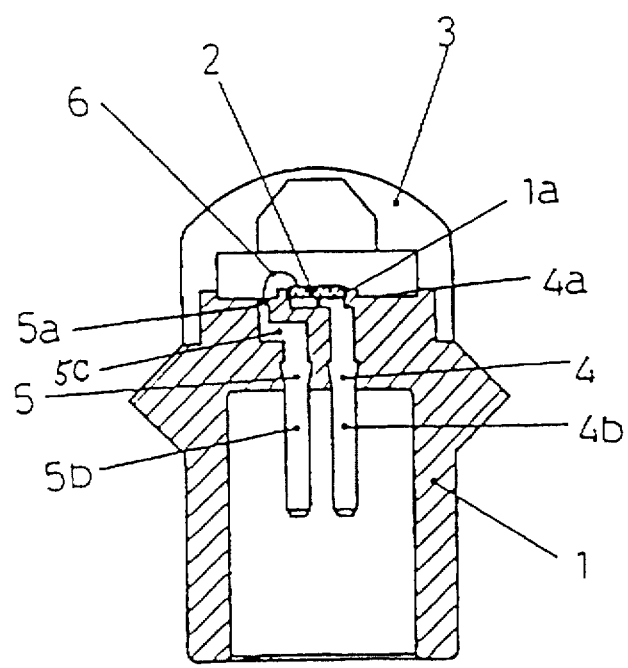
FIG. 1 is a cross-sectional view showing a solar radiation sensor used for an air-conditioning system of an automotive vehicle in accordance with a first embodiment of the present invention.

Preferred embodiments of the present invention will be explained in greater detail hereinafter, with reference to the accompanying drawings. Identical parts are denoted by an identical reference numeral throughout views.

FIG. 1 shows a solar radiation sensor in accordance with a first embodiment of the present invention. In FIG. 1, generally denoted by reference numeral 1 is a sensor casing body made of nylon 66 (white color group) containing 15% of grass fiber.

Provided centrally on the upper surface of the sensor casing body 1 is a light sensing element 2. Although only one light sensing element 2 is disclosed in the drawing, it is needless to say that a plurality of light sensing elements can be provided on the upper surface of sensor casing body 1.

The light sensing element 2, which can be constituted by a photo diode, is responsive to solar light entering through its sensing face and generates a signal representative of the quantity of the received solar radiation.

A cover 3 is fixed to the sensor casing body 1 to protect or surround the sensitive and delicate light sensing element 2 entirely and hermetically. The cover 3 is transparent to the light, semi-spherical in shape, and capable of converging the light like a lens. Thus, the light sensing element 2 can effectively collect the light entering from all directions through cover 3. Preferable material applicable to cover 3 is, for example, black polycarbonate resin.

The upper or top surface of sensor casing body 1 is almost flat except the region near the periphery of light sensing element 2. More specifically, a ridge 1a is provided on the upper surface of sensor casing body 1 so as to surround all the peripheral side of light sensing element 2 or clamp the opposite sides of it. The provision of such a ridge 1a is to place the light sensing element 2 in a predetermined position on the upper surface of sensor casing body 1.

Instead of forming the ridge 1a protruding from the upper surface of the sensor casing body 1, it will be also preferable to form an equivalent shallow recess on the upper surface of the sensor casing body 1 because light sensing element 2 could be fixed by the shoulder of the recess in the same manner as the engagement by the protruding ridge 1a.

By the provision of ridge 1a or its equivalent on the upper surface of sensor casing body 1, it becomes possible to precisely position the light sensing element 2 with respect to the cover 3 and to eliminate the dispersion in the performance characteristics of the solar radiation sensor, thereby stabilizing the performance characteristics.

Denoted by reference numeral 4 is a first lead leg having an upper part serving as a contact plate 4a horizontally lying beneath the light sensing element 2 and a lower part serving as an external connecting terminal 4b extending downward from a portion near the contact plate 4a where the first lead leg 4 is perpendicularly bent downward.

The contact plate 4a serves as a means for providing direct connection between the first lead leg 4 and light sensing element 2 at the bottom thereof.

Meanwhile, denoted by reference numeral 5 is a second lead leg offset from light sensing element 2 but provided in almost parallel to the first lead leg 4. The configuration of second lead leg 5 is slightly different from the first lead leg 4 in that the second lead leg 5 is bent in a crank manner.

More specifically, second lead leg 5 has an upper part 5a extending upward, a lower part 5b offset from upper part 5a but extending downward, and a middle part 5c extending horizontally so as to connect the lower end of upper part 5a and the upper end of lower part 5b.

The upper part 5a serves as a connecting edge to be connected, at its upper end, to one end of a wire 6 which has the other end connected to the light sensing element 2. The lower part 5b serves as an external connecting terminal disposed in parallel with external connecting terminal 4b so as to extend same amount into a hollow space inside the cylindrical sensor body 1.

For example, first and second lead legs 4 and 5 are made of brass with plated Sn (tin), while contact plate 4a and connecting edge 5a are plated by gold. These lead legs 4 and 5 are integrated with the sensor casing body 1, being manufactured as a single part for facilitating the installation or assembling of sensor parts.

Although this embodiment shows only one lead leg (4) directly connected to the light sensing element 2, it will be readily understood that plural lead legs (4, 5) can be brought into direct contact with the light sensing element 2.

As apparent from the foregoing description, the first embodiment of the present invention provides a solar radiation sensor which comprises first and second lead legs 4 and 5 integrated with sensor casing body 1, each of first and second lead legs 4 and 5 having an upper part (4a, 5a) serving as a portion to be connected to light sensing element 2 and a lower part (4b, 5b) serving as an external connecting terminal.

Such integrated arrangement is advantageous in solving the problem of the conventional sensor that the connecting portions, mostly soldered or welded, possibly be damaged by thermal expansion or contraction caused by frequent temperature changes.

Furthermore, the present invention provides a solar radiation sensor characterized in that an engaging portion (ridge 1a or its equivalent) is provided on the upper surface of sensor casing body 1 so that the light sensing element 2 can be precisely positioned with-respect to the cover 3.

Stabilizing the positional relationship between light sensing element 2 and cover 3 leads to enhancement of the reliability of the sensor in the performance characteristics thereof.

Figure 2:
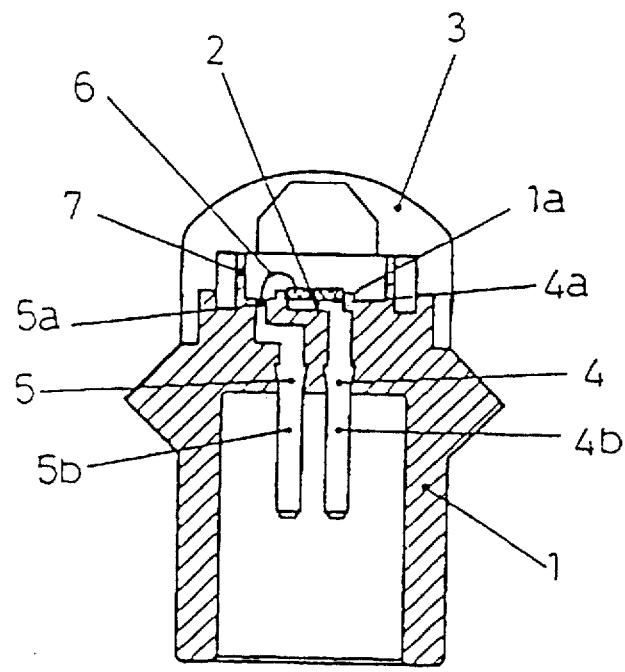
FIG. 2 is a cross-sectional view showing a solar radiation sensor used for an air-conditioning system of an automotive vehicle in accordance with a second embodiment of the present invention.
Figure 3:
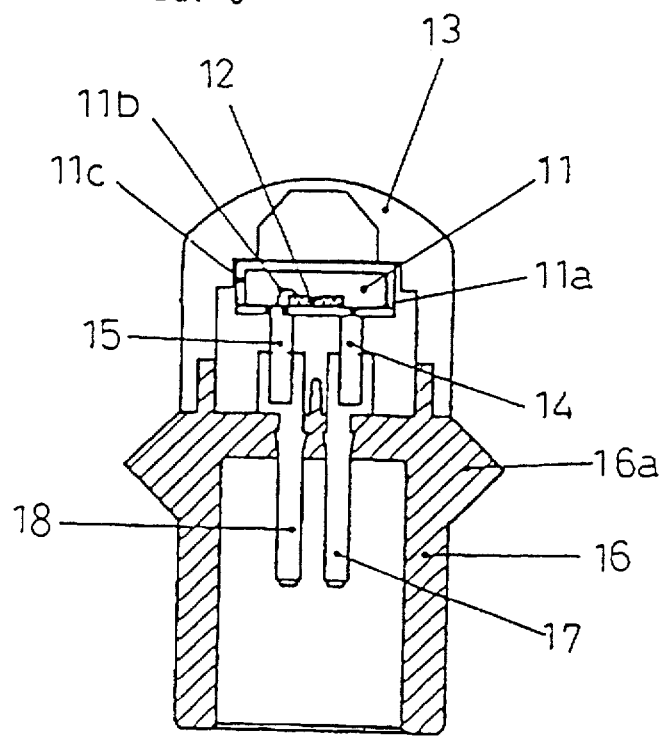
FIG. 3 is a cross-sectional view showing a conventional solar radiation sensor used for an air-conditioning system of an automotive vehicle.

Next, a modified solar radiation sensor in accordance with a second embodiment of the present invention will be explained with reference to FIG. 2. The second embodiment is similar to but difference from the first embodiment in that a wall 7 is additionally provided around the light sensing element 2. The wall 7, preferably a cylindrical wall having a height sufficiently higher that the light sensing element 2, protrudes upward from the upper surface of sensor casing body 1 so as to surround the light sensing element 2 in the inside space of the semi-spherical cover 3. The wall 7 has a property of shielding infrared ray.

Providing such a shielding wall around the light sensing element 2 is advantageous in that the quantity of solar radiation can be stabilized without causing dispersion.

As apparent from the foregoing description, the present invention provides a novel-and excellent solar radiation sensor used for the control of an air-conditioning system of an automotive vehicle, characterized in that the number of connecting (or welding) portions is fairly reduced compared with the conventional sensor. Thus, it becomes possible to reduce the possibility of damaging the connecting portions when subjected to repetitive thermal expansions and contractions, enhancing the reliability of the sensor as a result.

Furthermore, there is provided an engaging portion on the upper surface of sensor casing body so that the light sensing element can be precisely positioned with respect to the cover. Hence, it becomes possible to stabilize the positional relationship between light sensing element and cover and enhance the reliability of solar radiation sensor.

Still further, lead legs are integrated with the sensor casing body. It thus becomes possible to decrease the manpower and time in the assembling or installation of sensor parts, bringing the merits of reducing the significant amount of manufacturing costs.

Yet further, there is provided an infrared-ray shielding wall around the light -sensing element. Therefore, it becomes possible to reduce the dispersion in the sensor performance characteristics and accordingly it becomes possible to stabilize the performance characteristics.

As this invention may be embodied in several forms without departing from the spirit of essential characteristics thereof, the present embodiments as described are therefore intended to be only illustrative and not restrictive, since the scope of the invention is defined by the appended claims rather than by the description preceding them, and all changes that fall within metes and bounds of the claims, or equivalents of such metes and bounds, are therefore intended to be embraced by the claims.

What is claimed is:

1. A solar radiation sensor comprising:

a light sensing element detecting the quantity of light entering therein;

first and second lead legs extending perpendicular from beneath said light sensing element each lead leg conducting an electric signal representing the quantity of the light detected by said light sensing element;

a sensor casing body supporting said light sensing element and said first and second-lead legs, said sensor casing body having a flat surface on which said light sensing element is directly mounted;

a cover transparent to the light and protecting said light sensing element mounted on said sensor casing body, wherein each of said first and second lead legs has one end formed into a contact portion connected to said light sensing element and the other end formed into an external connecting terminal.

2. The solar radiation sensor defined by claim 1, wherein an engaging portion is formed an said sensor casing body to position said light sensing element with respect to said cover.

3. The solar radiation sensor defined by claim 1, wherein said first and second lead legs are integrated with said sensor casing body.

4. The solar radiation sensor defined by claim 1, wherein an infrared-ray shielding wall is provided on said sensor casing body so as to surround said light sensing element.

5. A solar radiation sensor comprising:

a light sensing element detecting the quantity of light entering therein;

a lead leg extending perpendicular form beneath said light sensing element and directly connected to said light sensing element;

a sensor causing body having a flat surface on which said light sensing element is directly mounted;

a cover transparent to the light and fixed to said sensor casing body so as to protect said light sensing element, where said lead has an upper part lying beneath said light sensing element and a lower part perpendicular to said upper part and extending into a hollow space of said sensor casing body, said upper part serving as a means for providing direct connection to a bottom of said light sensing element, while said lower part serving as an external connecting terminal for outputting an electric signal representing the quantity of the light detected by said light sensing element.

6. The solar radiation sensor defined by claim 5, wherein the surface of said sensor casing body is almost flat except a region near the periphery of said light sensing element.

7. The solar radiation sensor defined by claim 6, wherein a ridge is formed around-said light sensing element to fix said light sensing element at a predetermined position on said surface of said sensor casing body.

8. The solar radiation sensor defined by claim 5, wherein the lower part of said lead leg is bent perpendicularly at a portion near the upper part of said lead leg.

* * * * *